United States Patent [19]

Schlonski

[11] Patent Number: 4,824,275

[45] Date of Patent: Apr. 25, 1989

[54] TORQUE INDICATING PROPELLER SHAFT

[75] Inventor: Albrecht Schlonski, Essen, Fed. Rep. of Germany

[73] Assignee: GKN Cardantec International Gesellschaft Für Antriebstechnik mbH, Essen, Fed. Rep. of Germany

[21] Appl. No.: 112,745

[22] Filed: Oct. 22, 1987

[30] Foreign Application Priority Data

Oct. 24, 1986 [DE] Fed. Rep. of Germany ....... 3636167

[51] Int. Cl.$^4$ ................................................ B25G 3/00
[52] U.S. Cl. ....................................... 403/27; 116/212
[58] Field of Search ........... 403/27; 116/212, DIG. 34

[56] References Cited

U.S. PATENT DOCUMENTS 4,408,925 10/1983 Louie ..................................... 403/27

FOREIGN PATENT DOCUMENTS 142914 11/1953 Sweden ................................. 403/27
1301283 12/1972 United Kingdom .................. 403/27

Primary Examiner—James T. McCall
Attorney, Agent, or Firm—Toren, McGeady & Associates

[57] ABSTRACT

An adjustable length propeller shaft (1) has a visual torsional load indicating device including a marker (7) on a sealing collar (6) of one shaft part (9) and a calibrated scale (8) on the sleeve (5) of the other shaft part (10); an end journal (4) of the shaft part (9) being in telescopic torque transmitting relation with the sleeve (5) and surrounded by the sealing collar (6). Any permanent torsional deformation between the journal (4) and sleeve (5) results in a permanent relative rotational movement therebetween observable as a movement of the marker relative to the scale.

7 Claims, 3 Drawing Sheets

TORQUE INDICATING PROPELLER SHAFT

FIELD OF THE INVENTION

This invention relates to an adjustable length propeller shaft comprising two propeller shaft parts assembled in partially telescopic engagement with one another and in torque transmitting relationship. One of the shaft parts is provided with an end portion telescopically engaged within a sleeve at the end of the other shaft part; the end portion and the sleeve having cooperating profiles for the transmission of torque between the two shaft parts. The propeller shaft also includes a sealing collar secured adjacent the said end portion of the one shaft part and extending axially of the end portion to embrace the sleeve on the other shaft part.

Adjustable length propeller shafts in which the telescopically assembled shaft parts are protected by a sealing collar are known from, for example, DE-GM 7016023 but, in the teachings of this patent specification, the provision of the sealing collar is only to protect the telescopically assembled parts against the ingress of contaminants.

There are also known various methods of measuring the torque occurring in a shaft but none of such methods is suitable for the monitoring of torsional overloads which may occur in a propeller shaft fitted, for example, in the driveline of a vehicle.

SUMMARY OF THE INVENTION

It is an object of the present invention to provide an adjustable length propeller shaft having torsional load indicating means capable of indicating torsional overloads.

In accordance with the invention there is provided an adjustable length propeller shaft comprising first and second shaft parts; said first shaft part having an end portion telescopically engaged within a sleeve on said second shaft part, said end portion and said sleeve having cooperating profiles for the transmission of torque between said shaft parts; a sealing collar secured to said first shaft part extending axially of said end portion to embrace said sleeve on said second shaft part; and torsional load indicating means on said sealing collar and said sleeve.

An adjustable length propeller shaft constructed in accordance with the invention has the advantage that any overloads occurring in the torque transmitting region thereof are recognisable through a permanent indication given by the torsional load indicating means. This is of particular importance in a propeller shaft used in a commercial vehicle which, in such application, is recognised as a safety critical part of the vehicle since the propeller shaft has to accommodate and pass on braking forces from the engine brake and/or other retarders as well as transmitting drive from the engine to the road wheels.

A propeller shaft in accordance with the invention is also suitable for use in a test rig for recording torque by, for example, applying an optical stroboscopic arrangement to the propeller shaft with the flash frequencies being derived from the rotational speed of the shaft.

The torsional load indicating means may comprise a marker at the axially outer free end of the sealing collar and a scale on said sleeve adjacent to said marker, or alternatively, the torsional load indicating means may comprise a marker on said sleeve and a scale at the axially outer free end of the sealing collar adjacent the said marker.

The scale may be calibrated into regions indicating permissible torsional overload and impermissible torsional overload and, conveniently, the scale is coloured in different regions thereof, whereby the degree of overload may be emphasised according to a colour code.

It is preferable also that the said end portion of the first shaft part is specifically constructed to accept a nominal degree of deformation upon the occurrence of torsional overload occurring between it and the sleeve on the second shaft part.

DESCRIPTION OF THE DRAWINGS

Other features of the invention will become apparent from the following description given herein solely by way of example with reference to the accompanying drawings wherein.

DESCRIPTION OF PREFERRED EMBODIMENTS

Figure 1:
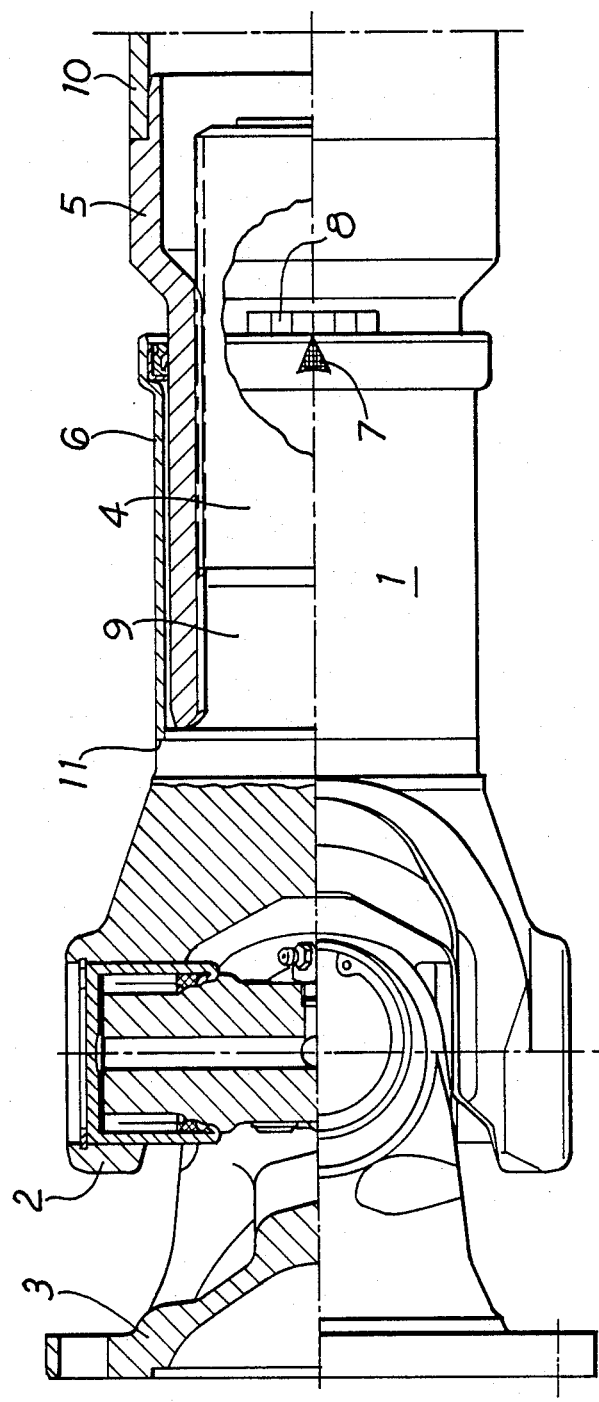
FIG. 1 is a side part-elevation, part cross-sectional view of a propeller shaft having torsional load indicating means in accordance with the invention wherein the marker is carried on the sealing collar of the first shaft part and the scale is carried on the sleeve of the second shaft part.

Referring to FIG. 1 of the drawings there is indicated an adjustable length propeller shaft 1 of the type which may be utilised, for example, as the longitudinally extending drive shaft between the engine and driven road wheels of a commercial vehicle. The propeller shaft 1 is formed in two shaft parts 9 and 10, the part 9 having an end portion in the form of a journal 4 telescopically engaged within a sleeve 5 at the end of the other shaft part 10. The exterior surface of the journal 4 and the interior surface of the sleeve 5 are suitably profiled for torque transmitting cooperation with one another. As illustrated, that shaft part 9 which has the journal 4 is connected via a universal joint 2 to a connecting flange 3 which is conveniently provided for connection of the propeller shaft to a transmission output or a differential.

A sealing collar 6 is fixedly secured to the shaft part 9 adjacent the inner end of the journal 4 as shown at position 11 to extend axially of the journal and embrace the sleeve 5. A sealing ring is provided internally of the collar 6 at its axially outer free end to engage the exterior surface of the sleeve 5 and prevent the ingress of contaminants into the telescopic connection between the two shaft parts 9 and 10. The sealing collar 6 has sufficient axial length to remain in sealing contact with the sleeve 5 whilst accommodating variations n axial length of the telescopic engagement between the journal 4 and the sleeve 5.

In accordance with the invention there is provided torsional load indicating means which, as illustrated in FIG. 1, comprises a marker 7 at the axially outer end of the sealing collar 6 on the exterior surface thereof and a scale 8 on the exterior surface of the sleeve 5; the scale having sufficient axial length to accommodate changes in axial relationship between the journal 4 and the sleeve 5.

Figure 2:
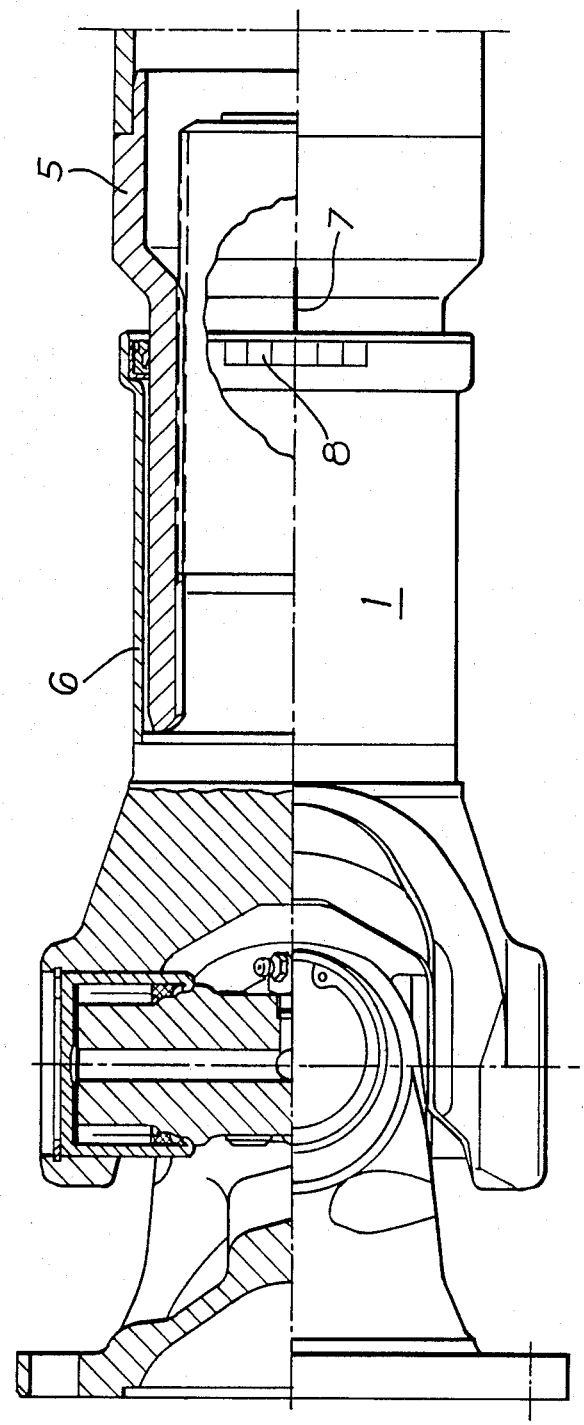
FIG. 2 a similar view of a propeller shaft to that of FIG. 1 but wherein the scale is carried on the sealing collar and., the marker is carried on the sleeve.

In FIG. 2 of the drawings like reference numbers refer to like parts hereinbefore described and, in this embodiment, the marker 7 is carried on the exterior surface of the sleeve 5 whereas the scale 8 is carried on the exterior surface of the sealing collar 6 at the axially outer free end thereof.

Figure 3:
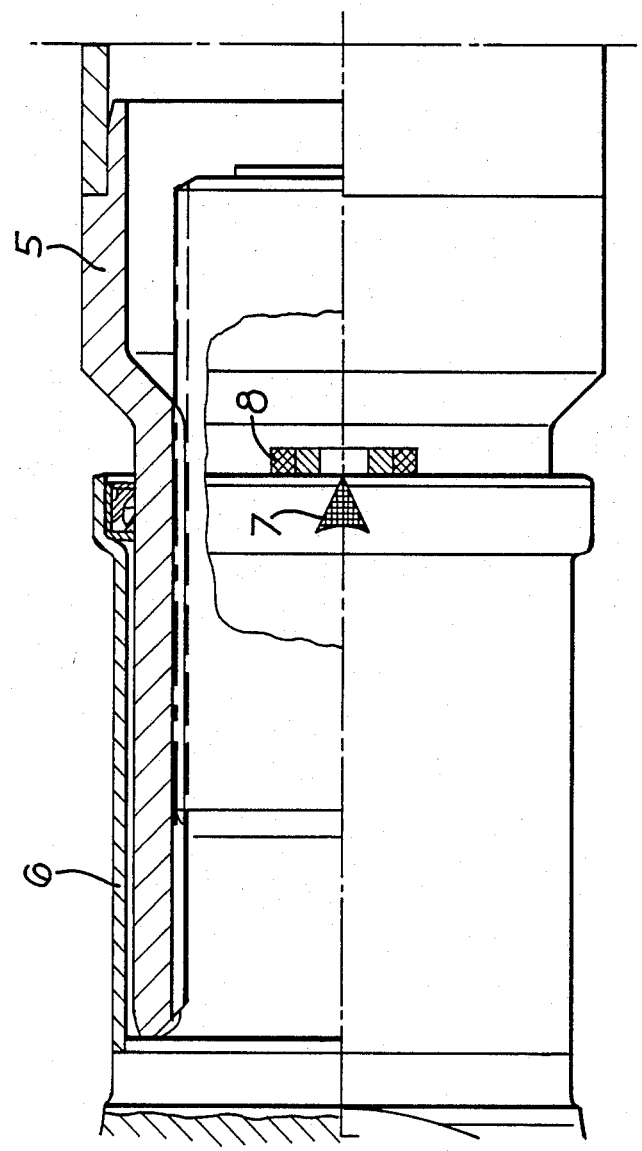
FIG. 3 is an enlarged side part-elevation, part cross-sectional view of the inter-engaging end portion and sleeve parts showing the scale carried on the sleeve and arranged with coloured regions thereof.

In FIG. 3 of the drawings like reference numerals again refer to like parts hereinbefore described and, in this embodiment, the scale 8 is carried on the exterior surface of the sleeve 5 as in the FIG. 1 embodiment but is provided with coloured regions.

The journal 4 which extends within the sleeve 5 is so constructed as to accept a nominal degree of permanent deformation upon the occurrence of torsional overload therebetween. Upon torsional overload, a permanent relative rotation will occur between the journal 4 and the sleeve 5 which will be clearly indicated by movement of the marker 7 relative to the scale 8. This arrangement permits visual observation of any undesirable degree of torsional overload between the two shaft parts 9 and 10 thereby permitting the propeller shaft to be taken out of service before the occurrence of failure.

I claim:

1. An adjustable length propeller shaft comprising axially extending first and second shaft parts; said first shaft part having an axially extending end portion telescopically engaged within an axially extending sleeve on said second shaft part, said end portion and said sleeve having cooperating profiles for the transmission of torque between said shaft parts; a sealing collar secured to said shaft part and extending axially of said end portion, said sealing collar extending axially along and encircling said second shaft part, means on said sealing collar in contact with an outer surface of said sleeve on said second shaft part for providing sealing contact with said sleeve while accommodating variations in axial length in the telescopic engagement of said first and second shaft parts; and torsional load indicating means on said sealing collar and said sleeve for indicating overloads in torque transmission between said shaft parts.

2. A propeller shaft as claimed in claim 1 wherein said torsional load indicating means comprises a marker at the axially outer free end of the sealing collar and a scale on said sleeve adjacent to said marker.

3. A propeller shaft as claimed in claim 1 wherein said torsional load indicating means comprises a marker on said sleeve and a scale at the axially outer free end of the sealing collar adjacent to said marker.

4. A propeller shaft as claimed in any one of claims 2 to 3 wherein said scale is calibrated to indicate permissible torsional overload regions and impermissible torsional overload regions.

5. A propeller shaft as claimed in any one of claims 2 to 3 wherein said scale is coloured in different regions thereof.

6. A propeller shaft as claimed in any one of claims 1 to 3 wherein said end portion of the first shaft part is constructed to accept a nominal degree of deformation upon the occurrence of torsional overload between said end portion and said sleeve.

7. A propeller shaft as claimed in claim 1 wherein said sealing collar has an axially outer free end encircling said sleeve, said means on said sealing collar comprises a sealing ring provided at the axially fre end of said collar.

* * * * *